(12) United States Patent
Ackerman

(10) Patent No.: US 8,495,568 B2
(45) Date of Patent: Jul. 23, 2013

(54) SYSTEM AND METHOD OF IDENTIFYING AND TRACKING SOFTWARE PATTERN SOFTWARE RECIPES

(75) Inventor: Lee Murray Ackerman, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 12/136,139

(22) Filed: Jun. 10, 2008

(65) Prior Publication Data

US 2009/0307662 A1  Dec. 10, 2009

(51) Int. Cl.
*G06F 9/44* (2006.01)

(52) U.S. Cl.
CPC ....................................... *G06F 9/44* (2013.01)
USPC ....................................................... 717/120

(58) Field of Classification Search
None
See application file for complete search history.

(56) References Cited

PUBLICATIONS

T. Kobayashi and M. Saaki, "Software Development Based on Software Pattern Evolution", Proceedings of the 6th Asia-Pacific Software Engineering Conference, pp. 18-25, 1999.*
Henninger, S., & Corrêa, V. (2007), Software pattern communities: Current practices and challenges, 14th Conference on Pattern Languages of Programs (PLoP 07), Monticello, IL, Jan. 1, 2007.*

* cited by examiner

*Primary Examiner* — Jay Morrison
(74) *Attorney, Agent, or Firm* — Holland & Knight LLP; Brian J. Colandreo, Esq.; Jeffrey T. Placker, Esq.

(57) ABSTRACT

A method and computer program product for identifying two or more software patterns within a software environment. At least one relationship between the two or more software patterns is identified. A software recipe is defined including the two or more software patterns and the at least one relationship.

16 Claims, 2 Drawing Sheets

SYSTEM AND METHOD OF IDENTIFYING AND TRACKING SOFTWARE PATTERN SOFTWARE RECIPES

TECHNICAL FIELD

This disclosure relates to software patterns, and more particularly, to the tracking of software patterns and relationships between software patterns.

BACKGROUND

The use of software patterns ("software patterns") may improve the software development process. A software pattern may be a proven, best practice solution to a known problem within a given context. For example, a software pattern may be a general, reusable, customizable design solution to a software design problem that may take the form of a description, template, model, code sample, or other mechanism that facilitates a design solution. Different types of software patterns exist. For example, an idiom software pattern may include sections of software code, a design software pattern may include various software classes, and an architectural software pattern may provide an architectural level solution. Some software patterns are well known in the art; for example, the Model-View-Controller software pattern is a well known architectural software pattern. In many cases, a software pattern can describe relationships and interactions between classes and/or objects without specifying a final solution. Indeed, a software pattern, when instantiated, may benefit a code developer by facilitating a design solution, but the software pattern may also lend itself to customization so that the code developer can tailor the software pattern to his or her specific application.

A developer who employs and/or instantiates a software pattern within a design solution may find that, in order to fully realize the advantage of the software pattern, there may be a need to employ and/or instantiate multiple software patterns. Multiple software patterns that share a relationship may be called a software recipe. However, the application of multiple software patterns may be a complex and difficult process; it may take time, experience, and expertise to successfully analyze a design problem, choose a set of appropriate software patterns, and identify and utilize a software recipe. The successful selection and application of multiple software patterns may be more difficult than the selection and application of a single software pattern. The situation may be further complicated by the vast number of software patterns that exist.

The identification, tracking, and application of software recipes is primarily a manual process that requires a developer with considerable experience and expertise. A method and system may be employed to automate the software recipe application process and/or guide a developer during the application of one or more software recipes.

SUMMARY OF DISCLOSURE

According to a first implementation, a software recipe method includes identifying two or more software patterns within a software environment. At least one relationship between the two or more software patterns is identified. A software recipe is defined including the two or more software patterns and the at least one relationship.

One of more of the following features may be included. At least one software pattern of the two or more software patterns may include one or more of a software pattern existing within a software model; a software pattern existing between two or more software models; and a software pattern existing between a software model and one or more text-based artifacts. Identifying the two or more software patterns may include at least one of: identifying one or more software patterns registered within the software environment; identifying one or more calls associated with an instantiated software pattern; and identifying one or more software pattern parameters within a software model.

The at least one relationship may include one or more of a parameter shared between the two or more software patterns; an identical parameter used by the two or more software patterns; a first software pattern contained within a second software pattern; and an input of a first software pattern that matches an output of a second software pattern. The at least one relationship may further include one or more of a common target domain; a common software language; a common industry context; a common model template; a common project template; a common unified modeling language profile; a common domain-specific language; and a common stereotype.

A strength of the at least one relationship may be determined, wherein the strength is based upon, at least in part, one or more of a distance between the two or more software patterns; a degree of separation between the two or more software patterns; and a number of shared elements between the two or more software patterns.

It may be determined whether the two or more software patterns and the relationships match a software recipe paradigm. The software recipe and information about the software recipe may be stored in a repository. The software recipe and information about the software recipe may be provided for download. Information about the software recipe may be provided to an information consumer. The information consumer may include one or more of an individual, and an organization. The information may include one or more of a recommended software recipe, a suggested use of a recommended software recipe, and information about the instantiation of a recommended software recipe. Further, at least one of the two or more software patterns may be instantiated within the software environment.

The details of one or more implementations are set forth in the accompanying drawings and the description below. Other features and advantages will become apparent from the description, the drawings, and the claims.

According to a second implementation, a software recipe computer program product residing on a computer readable medium has a plurality of instructions stored thereon, which, when executed by a processor, cause the processor to perform operations comprising: identifying two or more software patterns within a software environment; identifying at least one relationship between the two or more software patterns; and defining a software recipe including the two or more software patterns and the at least one relationship.

One of more of the following features may be included. At least one software pattern of the two or more software patterns may include one or more of a software pattern existing within a software model; a software pattern existing between two or more software models; and a software pattern existing between a software model and one or more text-based artifacts. Identifying the two or more software patterns may include at least one of: identifying one or more software patterns registered within the software environment; identifying one or more calls associated with an instantiated software pattern; and identifying one or more software pattern parameters within a software model.

The at least one relationship may include one or more of a parameter shared between the two or more software patterns; an identical parameter used by the two or more software patterns; a first software pattern contained within a second software pattern; and an input of a first software pattern that matches an output of a second software pattern. The at least one relationship may further include one or more of a common target domain; a common software language; a common industry context; a common model template; a common project template; a common unified modeling language profile; a common domain-specific language; and a common stereotype.

A strength of the at least one relationship may be determined, wherein the strength is based upon, at least in part, one or more of a distance between the two or more software patterns; a degree of separation between the two or more software patterns; and a number of shared elements between the two or more software patterns.

It may be determined whether the two or more software patterns and the relationships match a software recipe paradigm. The software recipe and information about the software recipe may be stored in a repository. The software recipe and information about the software recipe may be provided for download. Information about the software recipe may be provided to an information consumer. The information consumer may include one or more of an individual, and an organization. The information may include one or more of a recommended software recipe, a suggested use of a recommended software recipe, and information about the instantiation of a recommended software recipe. Further, at least one of the two or more software patterns may be instantiated within the software environment.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings denote like elements.

DETAILED DESCRIPTION OF THE PREFERRED EMBODIMENTS

Figure 1:
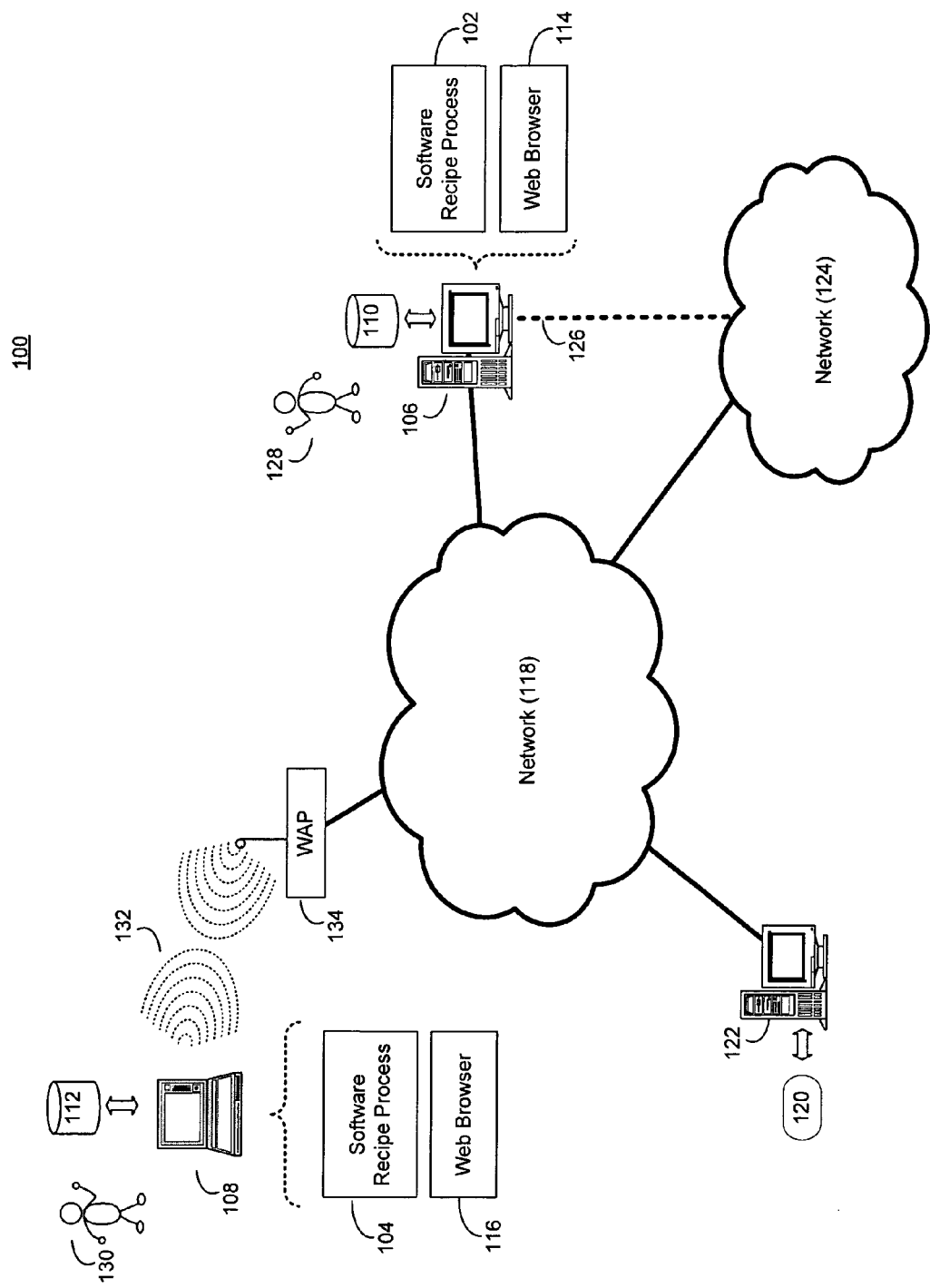
FIG. 1 diagrammatically depicts a system and architecture view of a software recipe process coupled to a distributed computing network

System Overview:

A system and architecture 100 for a software recipe process is shown in FIG. 1. As will be discussed below in greater detail, a software recipe process, such as software recipe processes 102, 104, may identify two or more software patterns within a software environment. At least one relationship between the two or more software patterns may be identified. A software recipe may be defined including the two or more software patterns and the at least one relationship.

The software recipe process (e.g., software recipe processes 102, 104) may reside on a computing device, examples of which may include, but are not limited to a desktop computer (e.g., desktop computer 106), on a laptop computer (e.g., laptop computer 108). Although not shown, the software recipe process may reside on any device capable of executing software, such as a personal digital assistant ("PDA"), cell phone, mainframe computer, gaming console, server computer, etc.

In an embodiment, the software recipe process (e.g., software recipe processes 102, 104) may be a computer program product that contains instructions executable by one or more processors. The instruction sets and subroutines of the software recipe process (e.g., software recipe processes 102, 104), which may be stored on a storage device (e.g., storage devices 110, 112, respectively), may be executed by one or more processors (not shown) and one or more memory architectures (not shown), such as processors residing in desktop computer 106 or laptop computer 108, for example. The instructions may be any type of compiled, interpreted, or hardware-based instructions including, but not limited to, machine code, byte code, script code, micro-code, assembly code and/or electronic circuitry. The instructions may, for example, be generated by software compilation, partial software compilation, manual entry, and/or circuit design and manufacture. The storage device (e.g., storage devices 110, 112) upon which computer program product and/or the instruction sets and subroutines may reside, may include any suitable computer readable medium, including but not limited to: hard disk drives; solid state drives; tape drives; optical drives; RAID arrays; random access memories (RAM); read-only memories (ROM), compact flash (CF) storage devices, secure digital (SD) storage devices, and memory stick storage devices.

In addition/as an alternative to being a client side process, executed by a client computing device, the software recipe process may be a server-side process residing on and executed by a server computer (not shown). Further, the software recipe process may be a hybrid client-side/server-side process executed in part by a client computing device and in part by a server computer.

Desktop computer 106 and laptop computer 108 may each run network operating systems, examples of which may include, but are not limited to the Microsoft Windows™, Ubuntu Linux™, OS2™, and Sun Solaris™ operating systems.

Software recipe processes 102, 104 may include a stand alone application or an applet/application/module that is executed within any third-party application (not shown). For example, software recipe processes 102, 104 may be an applet that runs within a web browser (e.g., web browsers 114, 116), e.g., Internet Explorer™ or Firefox™ web browsers. Additionally, software recipe processes 102, 104 may be network enabled, i.e., one or more of software recipe processes 102, 104 may communicate via a network and access resources over a network. The network (e.g., s network 118) may include a local area network (LAN), wide area network (WAN), or other data network, such as the Internet. Network resources may include, but are not limited to, printers, servers, peer computers, telephone systems, game consoles, scanners, cellular telephones, etc. For example, software recipe processes 102, 104, residing on desktop computer 106 and laptop computer 108, respectively, may access repository 120 residing on server computer 122 via network 118.

Server computer 122 may be any type of server computer. For example, Server computer 122 may be a PC server, a mainframe computer, a file server, a VAX™ server, etc. Server computer 122 may run a network operating system, including, but not limited to: Windows 2003 Server™, Redhat Linux™, or z/OS™. Server computer 122 may also execute one or more server applications. For example, server computer 122 may execute a web server application, examples of which include the Microsoft IIS™, Novell Webserver™, or Apache Webserver™ web server applications, that allow for Hyper Text Transfer Protocol ("HTTP") access to server computer 122 via network 118. Server computer 122 may also execute a database application (not shown), such as the SQL Server™, MySQL™, and Oracle™ database applications, for example.

Additionally, network 118 may be connected to one or more secondary networks (e.g., network 124), examples of which may include but are not limited to: a local area network, a wide area network, or an intranet, for example. Devices coupled to network 118, such as desktop computer 106, may be directly coupled to network 118, or may be coupled through secondary network 124, as illustrated with phantom link line 126.

Users 128, 130 may access software recipe processes 102, 104 directly through the devices on which software recipe processes 102, 104 are executed, namely desktop computer 106 and laptop computer 108, for example, or indirectly through networks 118, 124. Users (e.g., users 128, 130) may also access server computer 122 and repository 120 directly through network 118 and/or through secondary network 124.

The computing devices (e.g., desktop computer 106, laptop computer 108) may be physically or wirelessly coupled to network 118 (or network 124). For example, desktop computer 106 is shown directly coupled to network 118 via a hardwired network connection. Server computer 122 is also shown directly coupled to network 118 via a hardwired network connection. Laptop computer 108 is shown wirelessly coupled to network 118 via wireless communication channel 132 established between laptop computer 108 and wireless access point ("WAP") 134, which is shown directly coupled to network 118. WAP 134 may be, for example, an IEEE 802.11a, 802.11b, 802.11g, Wi-Fi, and/or Bluetooth device that is capable of establishing wireless communication channel 132 between laptop computer 108 and WAP 134.

The Software Recipe Process:

As discussed, a pattern may be a proven, best practice solution to a known problem within a given context. For example, a pattern may be a general, reusable, customizable design solution to a software design problem; it may be a description, template, model, code sample, or other mechanism that facilitates a design solution. A pattern of software patterns may be defined as a software recipe ("recipe"). Different types of patterns and recipes exist. Although not an exhaustive list, examples include: an idiom pattern that may comprise sections of code, a design pattern that may include various software classes, and an architectural pattern that may provide an architectural level solution. Examples of patterns well known in the art may include, for example, the Model-View-Controller pattern, which is a well known architectural pattern. In many cases, a pattern may describe relationships and interactions between classes and/or objects without specifying a final solution. Indeed, a pattern, when instantiated, may benefit a code developer by facilitating a design solution, but the pattern may also lend itself to customization so that the code developer can tailor the pattern to his or her specific application.

A developer who employs and/or instantiates a software pattern within a design solution may find that, in order to fully realize the advantage of the software pattern, there may be a need to employ and/or instantiate multiple software patterns. Multiple software patterns, when used together to solve a problem, may be called a software recipe. For the convenience of explanation, software recipe process 102 will be described in detail below. However, this should not be construed as a limitation on the present disclosure, as other software recipe processes (e.g., software recipe process 104) may be equally utilized.

Figure 2:
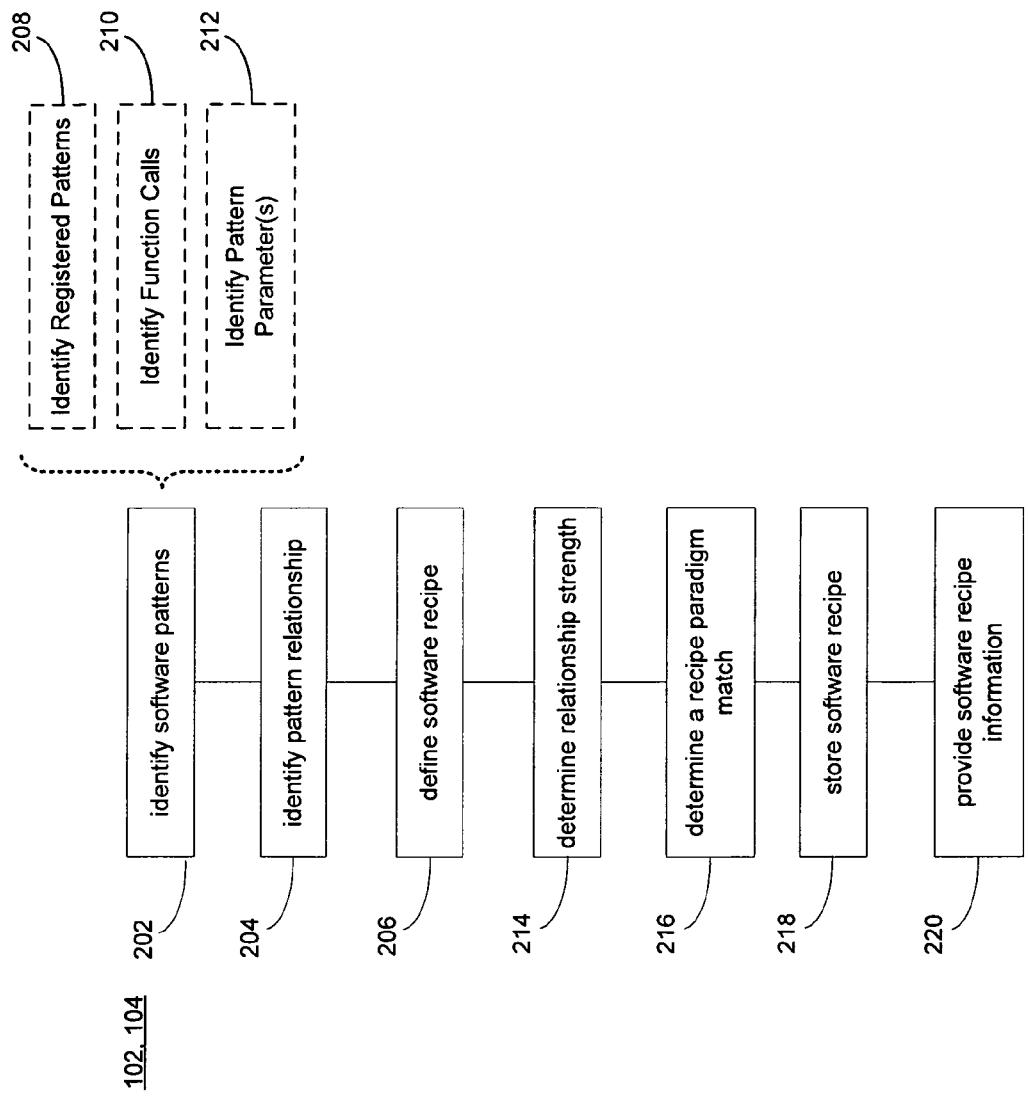
FIG. 2 is a flowchart of a process performed by the software recipe process of FIG. 1.

Referring to FIG. 2, software recipe process 102 may identify 202 two or more software patterns within a software environment. Software recipe process 102 may further identify 204 at least one relationship between the two or more software patterns. A software recipe may be defined 206, in which the software recipe may include the two or more software patterns and the at least one relationship.

The software environment, within which the two or more software patterns may be identified 202, may be a collection of tools, data, documentation, and other resources that affect and facilitate software development. Some software environments may allow a developer (e.g., user 128) to register patterns within the software environment. For example, the software environment may have a feature that keeps track of which patterns and/or sets of patterns may be used by the developer (e.g., user 128). Various types of software patterns may be identified within the software environment. For example, the software environment may contain one or more architectural software patterns, idiom software patterns, and/or design software patterns. The software patterns within the software environment may be software patterns well known in the art, such as the Model-View-Controller pattern. Additionally or alternatively, the software patterns within the software environment may be proprietary, private, and/or new software patterns that are not well known in the art. For example, a software pattern may be kept as a trade secret by an organization and not made public. Software recipe process 102 may identify 202 at least two software patterns, in which one or more of the at least two software patterns may have been instantiated within a software environment. For example, software recipe process 102 may recognize and identify 202 a software pattern has been instantiated and included as part of a software solution.

A software pattern that exists within a software model may be, for example, called out or identified within a software model. For example, a unified modeling language ("UML") model may contain an element that represents, calls out, or identifies a software pattern. Additionally or alternatively, a software pattern may exist between two or more software models. For example, two or more UML models may each call out a software pattern and the software pattern may facilitate a connection or relationship between the two or more UML models. Additionally or alternatively, a software pattern may exist between a software model and one or more text based artifacts. For example, a software pattern, when instantiated, may provide a bridge between a software model, such as a UML model, and text-based artifact. A text-based artifact may include any text based object. For example, a text-based artifact may include, but is not limited to: source code, such as C++ code, for example; script code, such as python code, for example; documentation, such as a Word™ document, for example; text files, such as .txt or .csv files, for example; data files, such as XML files, for example; or any other type or form of object that includes text. Alternatively, a software pattern may exist between a software model and one or more text-based artifact by providing, as at least part of the software pattern, a best practice solution for the interconnection, relationship, or merging of the software model and the one or more text-based artifacts. Although the examples above refer to UML models, one skilled in the art will recognize that various types of software models may be utilized including, but not limited to: a UML model, an EXPRESS or EXPRESS-G model, an ESL model, an IDEF model, etc.

A software recipe process, such as software recipe processes 102, 104, may identify 202 two or more software patterns in various ways. For example, software recipe process 102 may identify 208 one or more software patterns registered within a software environment. The software environments may allow a developer (e.g., user 128) to register patterns within the software environment. For example, and as mentioned above, the software environment may have a feature that keeps track of which software patterns are used. As such, when user 128 uses a software pattern or a set of software patterns, the software environment may track the software pattern, or set of software patterns, used by user 128. For example, in the context of an integrated development environment ("IDE"), the IDE may provide a mechanism that may allow user 128 to enter the name of any software pattern that user 128 is using. Alternatively, the software environment may automatically recognize that user 128 is using one or more specific software patterns and may keep track of which software patterns user 128 is using, how many software patterns user 128 is using, how many times each software pattern is instantiated within the software environment, and any other information relating to the use of software patterns. The software environment may also respond to queries for information about registered software patterns. Accordingly, software recipe process 102 may identify 202 one or more software patterns registered within a software environment.

Additionally or alternatively, software recipe process 102 may identify 202 one or more software patterns by identifying 210 one or more calls associated with an instantiated software pattern. For example, and as stated, the software environment may allow user 128 to instantiate software patterns within user 128's solution. When user 128 instantiates software patterns, the software environment may initiate certain function calls in order to effectuate the instantiation of the software patterns. Software recipe process 102 may be integrated, and/or may interact, with the software environment and may monitor (e.g. trap) and identify 210 the function calls. By identifying 210 the function calls that instantiate software patterns, software recipe process 102 may ascertain information about the software patterns being instantiated. For example, if user 128 directs the software environment to instantiate particular software patterns, the software environment may then initiate function calls to perform the instantiation. By monitoring and identifying 210 those function calls, software recipe process 102 may gather information relating to the particular software patterns including, but not limited to: the name of the software patterns, the number of inputs to the software patterns, the number of outputs to the software patterns, the type of software patterns, the size of the software patterns, or any other information related to the software patterns.

Software recipe process 102 may identify 202 one or more software patterns by identifying 212 one or more software pattern parameters within a software model. Software patterns may contain a plurality of parameters that may take various forms. For example, a parameter of a software pattern may be a software pattern input, a software pattern output, a name of a software pattern, a size of a software pattern, a context of a software pattern, etc. In general, a software pattern parameter within a software model may be any type of information relating to a software pattern. Software recipe process 102 may identify 202 a software pattern by identifying 212 one or more parameters of the software pattern within a software model and/or within an instantiation of a software pattern. For example, if a particular software pattern has a particular size and a particular input or set of inputs, software recipe process 102 may identify 202 the particular software pattern by identifying 212 and/or recognizing the particular pattern size and particular pattern input or set of inputs within a software model, or instantiated within a software solution.

Software recipe process 102 may also identify 204 at least one relationship between the two or more software patterns. Software patterns may be related in various ways. For example, two or more software patterns may each be instantiated within a design solution such that the two or more software patterns share an instantiation environment. Additionally or alternatively, two or more software patterns may be commonly used within a particular context. For example, two or more software patterns may be commonly used to facilitate software design solutions within the field of medical equipment design, and the relationship between the two or more software patterns may be defined by the tendency for the software patterns to be commonly employed within the field of medical equipment design, for example. As will be discussed in greater detail, various types of relationships between two or more software patterns may exist. In general, a software recipe process, such as software recipe process 102, may identify at least one relationship between two or more software patterns.

Software recipe process 102 may identify 204 various types of relationships between software patterns. Software recipe process 102 may, for example, identify a relationship including a parameter shared between two or more software patterns. For example, two software patterns may each have a common parameter. The two software patterns may, for example, each access the same parameter such as a shared DVD drive, a shared database, or any other shared resource or parameter.

Software recipe process 102 may, for example, identify 204 a relationship including an identical parameter used by the two or more software patterns. Two or more software patterns may each have an identical parameter. For example, two software patterns may each contain an identical inclusion of a particular class, subclass, integer, sub-pattern, or any other form of identical parameter.

Software recipe process 102 may, for example, identify 204 a relationship including a first software pattern contained within a second software pattern. A software pattern may contain, as a parameter, another software pattern or a reference to another software pattern. The software pattern or reference to a software pattern may create a relationship between two or more patterns. Additionally, the software pattern or reference to a software pattern may include a recursive reference or recursive instantiation of one or more software patterns, in which multiple software patterns or instantiations of software patterns are contained. Software recipe process 102 may, for example, identify 202 all the software patterns within the recursion of software patterns and my identify 204 all the recursive relationships between the software patterns within the recursion of software patterns. Additionally or alternatively, the software pattern and/or reference to a software pattern contained within a software pattern may comprise a linked list of software patterns or a tree of software patterns. Software recipe process 102 may, for example, identify 202 all the software patterns within the linked list of software patterns and/or tree of software patterns. Software recipe process 102 may also identify 204 all the relationships between software patterns by traversing the linked list of software patterns and/or tree of software patterns.

Software recipe process 102 may, for example, identify 204 a relationship including an input of a first software pattern that matches an output of a second software pattern. A first pattern may one or more inputs that matches one or more outputs of a second pattern. The patterns may share a relationship in that the output of one pattern may be used as the input of another pattern.

Software recipe process 102 may, for example, identify 204 a relationship including a common target domain. One or more software patterns may, for example, share a common target domain. A target domain may be a software domain including, but not limited to: A J2EE™ domain and a .NET™ domain, for example.

Software recipe process 102 may, for example, identify 204 a relationship including a common software language. One or more software patterns may, for example, share a common software language. The common software language may be a language including, but not limited to: the Java™ language, C, C++, C#, Perl, COBOL, python, assembly, etc.

Software recipe process 102 may, for example, identify 204 a relationship including a common industry context. One or more software patterns may provide best practice solutions for the same industry. For example, a relationship between two or more patterns may exist because the two or more patterns may each provide best practice solutions for problems within the thermal modeling industry.

Software recipe process 102 may, for example, identify 204 a relationship including a common model template. A model template may be a template used to create a model and/or a template within a model. For example, IBM™ Rational™ Software Architect/Modeler includes wizards that may be used to create models. The wizards may be examples of model templates. Two or more software patterns may have been created from the same model template. Additionally or alternatively, two or more software patterns may contain the same model template. The common model template may create a relationship between the software patterns.

Software recipe process 102 may, for example, identify 204 a relationship including a common project template. Projects may be created via a template. For example, most IDE environments may contain wizards and/or functions that create projects from a standard template and/or a custom template. Two or more software patterns may have been created from the same project template. Additionally or alternatively, two or more software patterns may contain the same project template. The common project template may create a relationship between the software patterns.

Software recipe process 102 may, for example, identify 204 a relationship including a common unified modeling language profile. As is known in the art, unified modeling language ("UML") profiles may tailor a model to a specific area or context. For example, a UML profile may tailor a model for business modeling. As another example, a UML profile may tailor a model to a specific technology. Standard UML profiles include, but are not limited to: a platform independent model, a platform specific model, a UML profile for COBRA™, a UML profile for System on a Chip, and a UML Testing Profile, for example. Two or more software patterns may have been created from the same UML profile. Additionally or alternatively, two or more software patterns may contain the same UML profile. The common UML profile may create a relationship between the software patterns.

Software recipe process 102 may, for example, identify 204 a relationship including a common domain-specific language. A domain-specific language may be a language dedicated to a particular problem domain, a particular problem representation technique, and/or a particular solution technique, for example. Domain-specific languages may be the opposite of general purpose languages such as C or Java, and may be the opposite of general purpose modeling languages such as UML. Examples of domain-specific languages include, but are not limited to: spreadsheet formulas, word processor macros, custom YACC grammars and language definitions that are targeted at a particular problem domain, the Csound language used to create audio files, etc. Two or more software patterns may contain and/or utilize a common domain-specific language. The common domain-specific language, for example, may constitute a relationship between the software patterns.

Software recipe process 102 may, for example, identify 204 a relationship including a common stereotype. A common stereotype may be, for example, a common Entity Bean, a common service, or other common element. If two or more software patterns share a common stereotype, the common stereotype may constitute a relationship between the software patterns.

Software recipe process may also define 206 a software recipe including the two or more software patterns and the at least one relationship. A software recipe may include two or more software patterns that may share a relationship. A software recipe may be distinguishable from a software pattern in various ways. For example, a software recipe may include one or more software patterns and/or one or more relationships between software patterns. For example, a user (e.g. users 128, 130) who employs and/or instantiates a software pattern within a design solution may find that, in order to fully realize the advantage of the software pattern, there may be a need to employ and/or instantiate multiple software patterns. A user (e.g. users 128, 130) may instantiate a software recipe instead of a software pattern. Instantiating a software recipe may allow the user to automatically fully realize the advantage of multiple software patterns. Generally, a software recipe may include a pattern of software patterns, a collection of software patterns, a construction of software patterns, or any group of software patterns and/or relationships between software patterns.

Software patterns, including software patterns that may be identified 202 and defined 206 as part of a software recipe, may take various forms. For example, a software pattern may exist within a software model, exist between two or more software models, and/or exist between a software model and one or more text-based artifacts.

Software recipe process 102 may also determine 214 a strength of the at least one relationship. The strength may be determined 214 based upon, at least in part, a distance between the two or more software patterns. For example, two software patterns may share a close relationship if they are found within the same package. Alternatively two software patterns may have a distant relationship if the software patterns are found within different projects. The particular distance between two or more software patterns may indicate that the relationship or relationships between the patterns has a particular strength.

The strength of a relationship between software patterns may also be determined 214 based upon, at least in part a degree of separation between the two or more software patterns. For example, a first software pattern may be a sub-pattern of a second software pattern, where the first and second patterns may have 0-degrees of separation. In another example, a first software pattern may be a sub-pattern of a second software pattern, which may be a sub-pattern of a third software pattern. The first and third patterns may have a 1-degree separation. Although these examples relate to software patterns and sub-patterns, it is understood that other types of relationships may create degrees of separations between patterns. For example, software patterns may be separated by inputs and outputs; the output of a first software pattern may be the input of a second software pattern, where the output of the second pattern may be the input of a third software pattern. Similarly, the first and third software patterns may have a 1-degree separation. The degree of separation may indicate a particular strength of the relationship between one or more patterns.

The strength of a relationship between software patterns may also be determined 214 based upon, at least in part, a number of shared elements between the two or more software patterns. For example, if two software patterns have a relatively large number of common, shared, or identical elements, it may indicate a particular strength of the relationship between the two software patterns. Alternatively, if two software patterns have relatively few common, shared, or identical elements, or no common, shared, or identical elements, it may also indicate a particular strength of the relationship between the software patterns.

Software recipe process 102 may determine 216 whether the two or more software patterns and the relationships match a software recipe paradigm. For example, if software recipe process 102 identifies 202 software patterns, identifies 204 pattern relationships, and defines 206 a software recipe, software recipe process 102 may determine whether the software recipe is a new recipe or if the software recipe is a known software recipe. If the software recipe matches a known software recipe paradigm, for example, the software recipe may be a known software recipe.

Software recipe process 102 may also store 218 the software recipe and any information about the software recipe (e.g. the patterns within the recipe, the relationships within the recipe, and/or any other information about the recipe) in a repository, such as repository 120, for example. A user, such as user 128, may access the repository and may download one or more software recipes and or information about software recipes. For example, repository 120 may allow user 128 to find and download all stored software recipes that provide software solutions for thermal modeling problems, for example. Accordingly, user 128 may search repository 120 for any stored software recipes and/or stored software recipe information relating to thermal modeling and may download any stored software recipe and/or stored software recipe information relating to thermal modeling, for example.

Software recipe process 102 may also provide 220 information about the software recipe to an information consumer, such as a user (e.g. user 128) or an organization. The provided 220 information may include, for example, a recommended software recipe. For example, user 128 may work on developing a particular software solution. Software recipe process 102 may provide 220 information about the software recipe to user 128. The information provided 220 by software recipe process 102 may include a recommended software recipe that user 128 may include in the software solution. As a further example, user 128 may work on developing a software solution for a thermal modeling problem. Software recipe process 102 may provide 220 information including one or more recommended thermal modeling software recipes that user 128 may use to facilitate the thermal modeling software solution. Additionally or alternatively, the information provided 220 by software recipe process 102 may include a suggested use of a recommended software recipe. The suggested use may include, for example, information about a best practice technique for instantiating and/or utilizing the software recipe. As a further example, user 128 may instantiate a software pattern within user 128's software solution. If the instantiated software pattern is identified 202 as part of an existing software recipe, the information provided 220 by software recipe process 102 may include a suggestion that user 128 use the existing software recipe as an alternative to using the instantiated software pattern. Accordingly, the use of the existing software recipe may benefit user 128 by providing a comprehensive solution to user 128's software problem. Additionally or alternatively, software recipe process 102 may provide 220 information about the instantiation of a recommended software recipe, which may include information about the size, inputs, outputs, comments, tips and techniques, and/or any other information about the instantiation of the software recipe, for example.

A number of implementations have been described. Nevertheless, it will be understood that various modifications may be made. Accordingly, other implementations are within the scope of the following claims.

What is claimed is:

1. A software recipe method comprising:
identifying two or more software patterns within a software environment;
identifying at least one relationship between the two or more software patterns;
defining a software recipe including the two or more software patterns and the at least one relationship;
determining a strength of the at least one relationship wherein the strength is based upon, at least in part, one or more of:
a distance between the two or more software patterns, wherein the distance is determined based upon, at least in part, one or more of (1) the two or more software patterns being found in a same software package and (2) the two or more software patterns being found within different software projects; and
a degree of separation between the two or more software patterns, wherein the degree of separation is determined based upon, at least in part, one or more of (1) a first pattern of the two or more software patterns being a sub-pattern of a second pattern of the two or more software patterns, and (2) an output of a third pattern of the two or more software patterns being an input to a fourth pattern of the two or more software patterns; and
determining whether the defined software recipe matches a software recipe paradigm, including determining whether the defined software recipe represents a new software recipe or a known software recipe.

2. The method of claim 1 wherein at least one of the two or more software patterns is instantiated within the software environment.

3. The method of claim 1 wherein at least one software pattern of the two or more software patterns include one or more of:
a software pattern existing within a software model;
a software pattern existing between two or more software models; and
a software pattern existing between a software model and one or more text-based artifacts.

4. The method of claim 1 wherein identifying the two or more software patterns includes one or more of:
identifying one or more software patterns registered within the software environment;
identifying one or more calls associated with an instantiated software pattern; and
identifying one or more software pattern parameters within a software model.

5. The method of claim 1 wherein the at least one relationship includes one or more of:
a parameter shared between the two or more software patterns;

an identical parameter used by the two or more software patterns;
a first software pattern contained within a second software pattern;
an input of a first software pattern that matches an output of a second software pattern.

6. The method of claim 1 wherein the at least one relationship includes one or more of:
a common target domain;
a common software language;
a common industry context;
a common model template;
a common project template;
a common unified modeling language profile;
a common domain-specific language; and
a common stereotype.

7. The method of claim 1 further including:
storing the software recipe and information about the software recipe in a repository; and
providing the software recipe and information about the software recipe for download.

8. The method of claim 1 further including:
providing information about the software recipe to an information consumer, wherein the information consumer includes one or more of: and individual, and an organization; and
wherein the information includes one or more of:
a recommended software recipe,
a suggested use of a recommended software recipe, and
information about the instantiation of a recommended software recipe.

9. A software recipe computer program product residing on a non-transitory computer readable medium having a plurality of instructions stored thereon, which, when executed by a processor, cause the processor to perform operations comprising:
identifying two or more software patterns within a software environment;
identifying at least one relationship between the two or more software patterns;
defining a software recipe including the two or more software patterns and the at least one relationship;
determining a strength of the at least one relationship wherein the strength is based upon, at least in part, one or more of:
a distance between the two or more software patterns, wherein the distance is determined based upon, at least in part, one or more of (1) the two or more software patterns being found in a same software package and (2) the two or more software patterns being found within different software projects; and
a degree of separation between the two or more software patterns, wherein the degree of separation is determined based upon, at least in part, one or more of (1) a first pattern of the two or more software patterns being a sub-pattern of a second pattern of the two or more software patterns, and (2) an output of a third pattern of the two or more software patterns being an input to a fourth pattern of the two or more software patterns; and
determining whether the defined software recipe matches a software recipe paradigm, including determining whether the defined software recipe represents a new software recipe or a known software recipe.

10. The software recipe computer program product of claim 9 wherein at least one of the two or more software patterns is instantiated within the software environment.

11. The software recipe computer program product of claim 9 wherein at least one software pattern of the two or more software patterns include one or more of:
a software pattern existing within a software model;
a software pattern existing between two or more software models; and
a software pattern existing between a software model and one or more text-based artifacts.

12. The software recipe computer program product of claim 9 wherein identifying the two or more software patterns includes one or more of:
identifying one or more software patterns registered within the software environment;
identifying one or more calls associated with an instantiated software pattern; and
identifying one or more software pattern parameters within a software model.

13. The software recipe computer program product of claim 9 wherein the at least one relationship includes one or more of:
a parameter shared between the two or more software patterns;
an identical parameter used by the two or more software patterns;
a first software pattern contained within a second software pattern;
an input of a first software pattern that matches an output of a second software pattern.

14. The software recipe computer program product of claim 9 wherein the at least one relationship includes one or more of:
a common target domain;
a common software language;
a common industry context;
a common model template;
a common project template;
a common unified modeling language profile;
a common domain-specific language; and
a common stereotype.

15. The software recipe computer program product of claim 9 wherein the operations further include:
storing the software recipe and information about the software recipe in a repository; and
providing the software recipe and information about the software recipe for download.

16. The software recipe computer program product of claim 9 wherein the operations further include:
providing information about the software recipe to an information consumer,
wherein the information consumer includes one or more of: an individual, and an organization; and
wherein the information includes one or more of:
a recommended software recipe,
a suggested use of a recommended software recipe, and
information about the instantiation of a recommended software recipe.

* * * * *